United States Patent [19]

Drucker

[11] Patent Number: 5,004,008
[45] Date of Patent: Apr. 2, 1991

[54] VARIABLE AREA REFRIGERANT EXPANSION DEVICE

[75] Inventor: Alan S. Drucker, Dewitt, N.Y.
[73] Assignee: Carrier Corporation, Syracuse, N.Y.
[21] Appl. No.: 502,896
[22] Filed: Apr. 2, 1990
[51] Int. Cl.$^5$ ............................................. G05D 7/01
[52] U.S. Cl. .................................. 137/504; 62/324.6; 137/493.2
[58] Field of Search .................... 62/222, 324.1, 324.6; 137/493.2, 504

[56] References Cited

U.S. PATENT DOCUMENTS

| | | | |
|---|---|---|---|
| 3,741,241 | 6/1973 | Jackson | 137/504 |
| 3,992,898 | 11/1976 | Duell | 62/324 |
| 4,513,777 | 4/1985 | Wright | 137/504 X |

Primary Examiner—Robert G. Nilson
Attorney, Agent, or Firm—Frederick A. Goettel, Jr.

[57] ABSTRACT

A refrigerant flow metering device which varies the expansion area of the device in response to the differential pressure between refrigerant in the high and low pressure sides of a refrigerant system. The expansion device includes a housing with a flow passage extending therethrough which is divided into a high pressure portion and low pressure portion by a partition. The partition has a flow metering port which extends therethrough and interconnects the high and low pressure portions. An elongated member extends through the flow metering port and cooperates with the flow metering port to define a refrigerant flow metering passageway therebetween. The elongated member is configured to vary the cross-sectional area of the flow metering passage in relation to the position of the elongated member to the flow metering port. Means are provided for supporting the elongated member within the flow passage and for controlling the axial position of the elongated member within the passage in response to the differential pressure between refrigerant in the high pressure portion and the low pressure portion.

6 Claims, 3 Drawing Sheets

VARIABLE AREA REFRIGERANT EXPANSION DEVICE

BACKGROUND OF THE INVENTION

1. Field of the Invention

This invention relates in general to refrigerant expansion devices. More specifically, it relates to expansion devices that have a variable expansion area that is operated by the pressure differential existing between the high pressure and the low pressure side of a refrigeration system.

2. Description of the Prior Art

A compression refrigeration system comprises a compressor, a condenser, an expansion device and an evaporator connected in a closed circuit to provide refrigeration. Hot compressed refrigerant vapor from the compressor enters the condenser, where it transfers heat to an external heat exchange medium and condenses. Condensed refrigerant, at a high pressure, flows through the expansion device, where the refrigerant undergoes a pressure drop and at least partially flashes to a vapor. The liquid-vapor mixture then flows through the evaporator where it evaporates and absorbs heat from the external surroundings. The low pressure refrigerant vapor then returns to the compressor to complete the circuit.

Although the expansion device is often of simple construction, its role in the refrigeration system is crucial. Ideally, the expansion device should meter refrigerant in a manner such that refrigerant leaving the evaporator is super-heated by a controlled, relatively small amount. The foregoing is desired to prevent any damaging liquid refrigerant from entering the compressor, and to avoid subjecting the compressor to excessive temperatures from highly super-heated vapor.

The performance of the expansion device plays an important role not only in protecting the compressor, but also in determining the cooling capacity of the refrigeration system. Since the system is a closed circuit, any effect the device has on the low or evaporator side is intimately tied in with the performance of the high or condenser side. Most conventional air conditioning systems incorporating compression refrigeration units of the kind described are designed to have a predetermined cooling capacity at a given ambient temperature. The capacity of the system usually decreases at ambient temperatures above the design point. The decrease in capacity of the system at temperatures above the design point has a direct effect on the requirements related to the type of expansion device.

Among the most commonly used expansion devices are thermostatic expansion valves, capillary tubes and other fixed orifice devices. Thermostatic expansion valves control the flow rate of liquid refrigerant entering the evaporator as a function of the temperature of the refrigerant gas leaving the evaporator. This control is achieved by varying the cross-sectional area through a needle type valve contained within the valve body. The needle is typically joined to a flexible metal bellows or diaphragm which is, in turn, actuated by a non-heat conducting rod connected at its other end to a sealed bellows. The sealed bellows, in turn, is joined to a thermostatic sensing bulb by means of a capillary tube. This bulb provides the feedback to the valve of the temperature of the refrigerant leaving the evaporator and the valve responds by increasing or decreasing the flow of refrigerant through the needle valve according to this temperature. While being highly efficient in their operation and readily responsive to changes in load upon the system to vary the flow of refrigerant to the evaporator, thermostatic expansion valves are also complicated and relatively expensive. Further, in split system type air conditioning systems, wherein the compressor and condenser are located outside at a remote location from the evaporator, the distance of the sensing bulb from the compressor result in less than optimum conditions in such systems.

Capillary tubes are generally used in place of thermostatic expansion valves, particularly in smaller applications, wherein ambient air is almost universally utilized as the condensing medium. Although capillary tubes are relatively inexpensive to manufacture and are simple to install, they have some serious operating limitations, particularly when they are operating at conditions above or below the design point of the system.

As an example, as the outdoor ambient temperature increases there is a large increase in the pressure differential across the expansion device. However, the pressure ratio across the compressor, and likewise the flow rate pumped by the compressor remain about the same. Because of the higher pressure, but the same flow rate, the amount of subcooling of the refrigerant entering the expansion device drops, which means that there is now less refrigerant residing in the high side of the system. To conserve total refrigerant in the system, it follows, that the evaporator must contain more refrigerant and this causes the superheat of the refrigerant leaving the evaporator to drop. As a result, at times, a portion of the refrigerant flow to the evaporator will not be evaporated and will remain in its liquid state as it passes from the evaporator to the compressor. The introduction of liquid refrigerant into the compressor may produce serious problems, such as breaking valves, in addition to a decrease of the efficiency of operation of the compressor.

An additional problem is found at relatively low ambient temperatures, wherein the pressure differential across the expansion device is of a relatively small magnitude. Under these conditions the subcooling of the refrigerant entering the expansion device increases as the outdoor ambient temperature falls, leading to more refrigerant being stored in the condenser, which starves the evaporator. As a result, more of the evaporator becomes filled with superheated vapor and the superheat leaving the evaporator increases. Using increased evaporator surface to superheat refrigerant is not putting the surface to its most effective use.

Another known fixed orifice expansion device is the orifice plate. Very simply, an orifice plate comprises a thin plate having an expansion orifice extending therethrough. Orifice plates are small and inexpensive, but they are erratic in performance. Hence, such plates are not in wide use.

In an attempt to provide an alternate expansion device, having the economical advantages of the capillary tube, while being smaller and more efficient in operation, the expansion device described in commonly assigned U.S. Pat. No. 3,642,030 entitled "Refrigerant Throttling Device" and issued on Feb. 15, 1972 in the name of Larry D. Amick was developed. That device comprises a body member having a tubular insert having prescribed length-to-bore diameter ratios, a conical inlet, and a conical exit.

Continuing efforts to develop an economical, efficient and effective fixed orifice expansion device resulted in the development of the expansion device described in commonly assigned U.S. Pat. No. 3,877,248 entitled "Refrigerant Expansion Device" which issued Mar. 1, 1974 in the name of Fred V. Honnold, Jr. That device comprises a body having an expansion conduit extending therethrough with a flat entrance presenting a sharp edge orifice to incoming refrigerant. The sharp edge entrance orifice effects a major portion of the refrigerant pressure drop at the entrance, so that only a short conduit length is necessary to effect the balance of the pressure drop demanded of the device. The body member is incorporated in a unitary coupling member configured to join refrigerant lines from the condenser to the evaporator.

Commonly assigned U.S. Pat. No. 3,992,898 entitled "Moveable Expansion Valve" which issued Nov. 23, 1976, in the name of Richard J. Duell and John A. Ferrel represents a further refinement of a fixed orifice expansion device. In the device of this patent, the refrigerant metering port is formed in a free floating piston which is mounted within a chamber. When refrigerant flows through this device in one direction, the free floating piston moves to one position wherein the refrigerant flow is through the metering port thereby serving as an expansion device. When refrigerant flows through this device in the opposite direction, the free floating piston moves to a second position wherein refrigerant is allowed to flow through a number of flow channels formed in the outer peripheral surface of the piston to thereby allow substantially unrestricted flow through the device. This arrangement allows such a device to be used, in combination with a second expansion device of the same design, in a heat pump system to allow the desired expansion of the refrigerant through the system flowing in both the cooling and heating directions.

In a cooling only system the expansion device of the '898 patent allows a system to be adjusted as to the amount of refrigerant superheat and other expansion parameters by changing the piston contained within the valve body in the field. The piston usually is changed to match the diameter of the metering port, running the length of the piston, with the requirements of a particular system to optimize performance.

U.S. Pat. No. 4,263,787, issued to the assignee hereof, entitled "Expansion Device with Adjustable Refrigerant Throttling" which issued Apr. 28, 1981 to Albert A. Domingorena relates to an improvement of the device of the '898 patent which allows adjusting the diameter of the metering port without having to break into the refrigeration circuit of the system to change the piston.

Summing up the state of the prior art, thermostatic expansion valves, while being highly efficient in their operation and readily responsive to changes in load upon the system to vary the flow of refrigerant to the evaporator, are complicated, expensive, and have drawbacks in certain applications. For this reason they are generally not employed in small applications. As a result, capillary tubes or other fixed orifice expansion devices are generally used in such small applications. Such devices are relatively inexpensive, however, as discussed above, they have operating limitations at both high and low ambient temperatures.

From the foregoing, it is evident that the need exists for a refrigerant expansion device which is inexpensive to manufacture and which is effective in performance over a wide range of operating conditions.

One approach to solving this problem has been to design a refrigerant flow metering device which has a flow metering passage which varies in cross-section in response to changes between the high and low side pressures in the refrigeration system. One such device is described in commonly assigned U.S. Pat. No. 3,659,433 entitled "Refrigeration System Including a Flow Metering Device" issued on May 2, 1972 in the name of David N. Shaw.

It is well known by refrigeration design engineers that, for every operating condition of a refrigeration system, there are optimum values of certain parameters, (e.g., subcooling and superheat), that can maximize performance of any given system. It is also well known that, for a given refrigeration system, operating at given conditions, the design tools are available, i.e., through analysis or through use of a design program, to determine the optimum expansion area in an expansion device that will result in such optimum parameters.

A refrigerant expansion device that is capable of responding to certain pressure and flow conditions to provide such optimum expansion areas within the device for such pressure and flow conditions is disclosed and claimed in commonly assigned U.S. patent application Ser. No. 473,481 filed on Feb. 1, 1990 entitled "Variable Area Refrigerant Expansion Device".

This application discloses a fluid flow metering device which has a housing with a flow passage extending therethrough. Mounted within the housing is a piston having a flow metering port extending axially therethrough. The piston is mounted such that it is moveable within the flow passage. An elongated member is also provided within the housing and extends into the metering port of the piston. The elongated member and the metering port cooperate to define a flow metering passage between them. The elongated member is configured such that the cross-sectional area of the flow metering passage varies in relation to the position of the moveable piston and the flow metering port formed therein. Means are provided for controlling the axial position of the piston with respect to the elongated rod as a function of the differential pressure across the flow metering piston.

SUMMARY OF THE INVENTION

An object of the present invention is to meter the flow of refrigerant in a refrigeration system in response to the operating conditions of the system.

A further object of the invention is to control the flow of refrigerant through an expansion device at an optimum flow rate regardless of the operating conditions of the refrigeration system in which the device is being used.

It is another object of the present invention to provide an expansion device wherein the cross-sectional area of the flow metering passage is controlled to an optimum size for a broad range of operating conditions of the system.

It is yet a further object of the invention to control the cross-sectional area of the flow metering passage of an expansion device as a function of the pressure differential between the high pressure side and the low pressure side of a refrigeration system.

It is another object of the invention to reduce the migration of liquid refrigerant from the condenser to the evaporator when a refrigeration system is shut off.

It is yet another object of the present invention to prevent the flow of refrigerant through an expansion device when the pressure differential across the expansion device exceeds a predetermined value.

It is a related object of the present invention to achieve these and other objects with a simple, safe, economical and reliable expansion device.

These and other objects of the present invention are achieved by a refrigerant expansion device which has a housing with a flow passage extending therethrough. A partition is formed within the housing which divides the flow passage therewithin into a high pressure portion and a low pressure portion. The partition has a flow metering port extending therethrough communicating the high and low pressure portions. An elongated member extends through the flow metering port and cooperates with the flow metering port to define a flow metering passageway therebetween. The elongated member is configured to vary the cross-sectional area of the flow metering passage in relation to the position of the elongated member to the flow metering port. Means are provided for supporting the elongated member within the flow passage and for controlling the axial position of the elongated member within the passage in response to the differential pressure between refrigerant in the high pressure portion and the low pressure portion.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein;

DESCRIPTION OF THE PREFERRED EMBODIMENT

Figure 1:
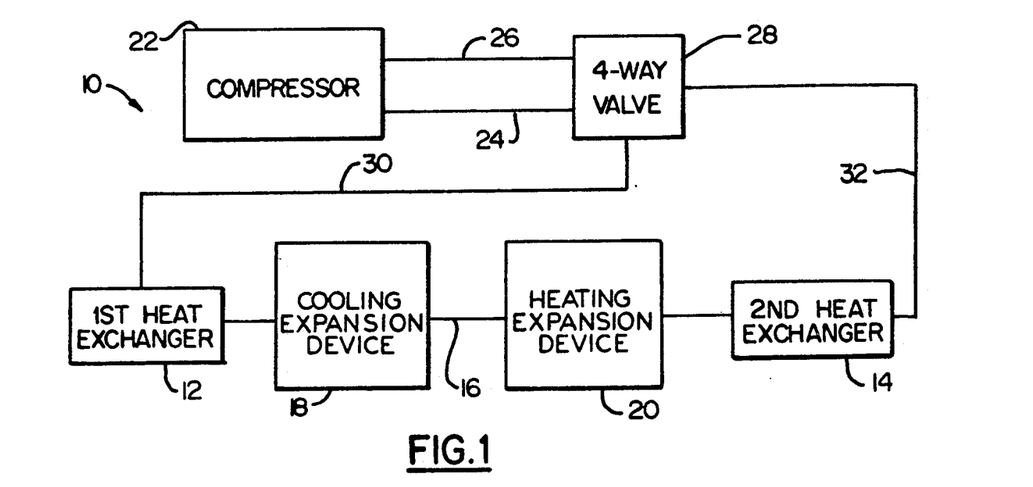
FIG. 1 is a diagrammatic representation of a heat pump system capable of being thermodynamically reversed to provide either heating or cooling, the system contains a cooling expansion device according to one embodiment of the present invention and a heating expansion device according to another embodiment of the present invention.

Referring now to the drawings, FIG. 1 depicts a reversible refrigeration system or heat pump 10 which is adapted for providing either heating or cooling. The heat pump system 10 includes a first heat exchanger 12 and a second heat exchanger 14. The two heat exchangers 12, 14 are operatively connected to one another by a supply line 16 which contains two expansion devices, a cooling expansion device 18, and, a heating expansion device 20, both of which are configured according to the principals of the present invention. The cooling expansion device 18 will be described hereinbelow in connection with FIGS. 2-5 and is adapted to meter refrigerant flowing through the supply line in one direction, while allowing substantially unrestricted flow of refrigerant therethrough in the opposite direction. The heating expansion device 20, which will be described in detail in connection with FIGS. 6-9, meters refrigerant therethrough according to the demands of the system when in heat pump operation and is adapted to also meter refrigerant flow in one direction, while allowing substantially unrestricted flow of refrigerant therethrough in the opposite direction. With continued reference to FIG. 1, the heat pump system includes a compressor 22 which is arranged so that the inlet piping 24 and the discharge piping 26 thereof are operatively associated with a 4-way valve 28. The 4-way valve, in turn, is operatively interconnected to the two heat exchangers 12 and 14 by way of refrigerant lines 30 and 32, respectively. By selectively positioning the 4-way valve 28, the connection to the discharge side and suction side of the compressor may be reversed between the heat exchangers 12 and 14. In the cooling mode of operation, the suction line 24 of the compressor 22 is connected to heat exchanger 12 via refrigerant line 30 and the discharge line 26 is connected to the heat exchanger 14 via refrigerant line 32. As a result, when so connected, heat exchanger 14 functions as a condenser, while heat exchanger 12 performs the duty of an evaporator. In the cooling mode, the refrigerant passing through the supply line 16 is thus metered from the high pressure condenser 14 to the low pressure evaporator 12 through the cooling expansion device 18. During such operation the heating expansion device 20 allows free, unrestricted flow therethrough as will be understood when the devices are described in detail hereinbelow.

With the components connected as described above for the cooling mode of operation, the compressor 22 compresses refrigerant vapor and the hot vapor is directed through the discharge line 26 to the 4-way valve 28 where it is directed via line 32 to the second heat exchanger 14 where the hot compressed vapor condenses and gives off heat to form a high pressure liquid refrigerant which then flows freely through the expansion device 20 and the refrigerant flow line 16 to the cooling expansion device 18. Expanded refrigerant is discharged from the expansion device 18 and directed to the first heat exchanger 12. The refrigerant in the first heat exchanger which functions as an evaporator, absorbs heat from an external heat exchange medium and vaporizes. The low pressure refrigerant vapor passes from the evaporator heat exchanger 12 via refrigerant line 30 and 4-way valve 28 back to the compressor via suction line 24.

The compression refrigeration system thus described is typical of that found in many air conditioning applications and it should be understood that it is applicable to numerous other refrigeration applications. The terms high side and low side used above are common terms used in the discussion of compression refrigeration systems. The compressor outlet and the inlet to the refrigeration device define the high pressure side of a refrigeration system. Similarly, the refrigeration expansion device outlet and the compressor inlet define the low pressure side of the system. The difference in pressure between the high and low sides of the system is directly related to the load or demand on the refrigeration system and the outdoor ambient temperature, as was described above. As will become more apparent hereinafter, the variable area expansion devices of the present invention use such pressure differentials, over a wide range of operating conditions of a refrigeration system, to provide optimum expansion areas for such operating conditions.

Referring now to FIGS. 2-5, it will be seen that a cooling expansion device according to the invention comprises a generally cylindrical body or housing 34 which defines a cylindrical elongated chamber 36 in the interior thereof. Extending from the right hand end of the housing 34 is a fitting 38 having a male thread 40 formed on the exterior thereof and having a fluid passageway 42 formed therein which communicates the interior chamber 36 with the exterior thereof. The male thread 40 is adapted to mate with a female connector (not shown) associated with a refrigerant line to create a fluid tight joint therebetween.

The left hand end of the housing 34 is open ended and has a female thread 44 formed in the interior thereof. The open end of the housing 34 is closed by an end fitting 46 which includes a cylindrical portion which has male threads 48 formed on the exterior thereof which mate with the threads 44 formed in the interior of the body 34. A gasket 50 is positioned adjacent the end of the housing 34 to sealingly engage a mating surface 52 formed adjacent the threads 48 on the end fitting 46 to assure a refrigerant tight joint therebetween. A reduced diameter nipple 54 extends from the left hand end of the end fitting 46. The nipple 54 has male threads 56 formed on the exterior thereof which are adapted to connect with an appropriate threaded connector associated with a refrigerant line in the same manner as described above with respect to the right hand end fitting 38. The nipple 54 further includes a fluid passageway 56 extending therethrough which communicates with the chamber 36. The passageway 56, the chamber 36, and the passageway 42, in the end fitting 38, together define a flow passage through the expansion device 18.

Extending from the interior wall 57 of the housing 34 is a flow metering wall or partition 58. Formed within the flow metering partition 58 is a flow metering port 60. The flow metering partition 58 divides the interior chamber 36 of the housing 34 into a high pressure portion 62 to the right of the partition 58 and a low pressure portion 64 to the left of the flow metering partition 58.

Axially disposed within the housing chamber 36 is an elongated member 66. The elongated member comprises a central portion 68 of substantially uniform diameter. Extending radially outwardly from the central portion 68 is a solid collar 70, which is larger in diameter than the flow metering port 60 in the flow metering partition 58. The diameter of the collar 70 is such that it overlaps with the left hand facing surface 72 of the flow metering partition 58 so that the right hand facing surface 74 of the collar 70 defines an overlapping annular interface with the left hand facing surface 72 of the partition. This interface serves to limit the axial motion of the elongated member 66 to the right as viewed in the drawing figures. Further, the left hand facing surface 72 of the partition is provided with an annular groove 76 which is adapted to receive and retain an o-ring 78. The o-ring 78 serves to engage the right hand facing surface 74 of the collar 70 to establish a fluid tight relationship between the collar 70 and the partition 58 when these components are biased into contact with one another under conditions which will be described below.

Extending from the right of the collar 70, the elongated member 66 further includes a flow metering section 80 which has a flow metering geometry formed thereon. The flow metering geometry is configured to cooperate with the flow metering port 60, formed in the partition 58, to define therebetween a flow metering passageway 82. The flow metering geometry of the flow metering section 80 has a cross-sectional area which progresses from a minimum at its origination 84, at the collar 70, to a maximum where it terminates 86, in a cylindrical section 88 of uniform cross-section.

With continued reference to the elongated member 66, a second section of enlarged diameter 90 extends to the left of the central portion 68 thereof. This enlarged section comprises a maximum diameter cross section 92 which tapers, to the left, to define a frusto-conical portion 94 which terminates in a substantially uniform diameter cylindrical end tip 96.

A helical, refrigerant metering spring 98 is disposed within the low pressure portion 64 of the housing 34. The spring surrounds the portion of the elongated member 66 to the left of the collar 70 and is supported at its right hand end by the left hand facing surface 100 of the collar 70 and its left hand end is received in an annular groove 102 machined into the interior face 104 of the end fitting 46. An annular upstanding ridge 106 is formed on the left hand facing surface 100 of the collar 70 to thereby radially position the spring 98 with respect to the elongated member 66.

Figure 2:
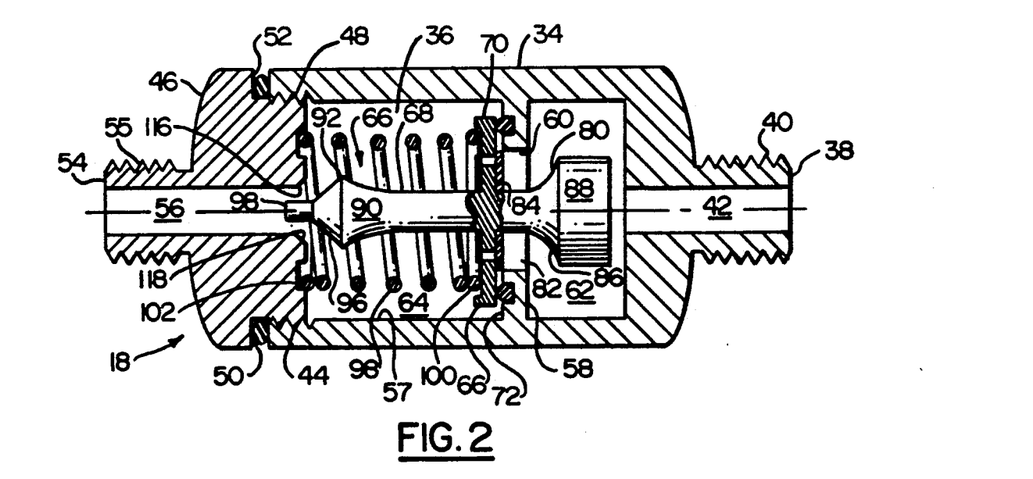
FIG. 2 is a longitudinal sectional view of a variable area cooling expansion device that is made in accordance with the principals and teachings of the present invention.

The size and spring rate of the spring 98 is determined by the particular refrigeration system application for which an expansion device is being used. As an example, as depicted in FIG. 2, the device is assembled such that the spring 98 is partially compressed. As a result, the spring exerts a biasing force upon the collar 70 to thereby establish the above described fluid tight relationship between the collar 70, the o-ring 78, and the partition 58. As is evident, this arrangement allows a pressure differential to be maintained between the high and low sides of the refrigeration system during system shutdown. A direct benefit of this feature is that the degradation coefficient $C_d$ of the refrigeration system is reduced. The degradation coefficient is a term defined by the U.S. Department of Energy which relates to the measure of the efficiency loss of the system due to the cycling of the system.

The magnitude of the system pressure differential which the device can maintain may be set by pre-loading the spring 98 to a desired threshold pressure differential. This pre-load may be achieved by selection of a spring having an appropriate spring rate and spring length. The pre-load may be further altered by the use of annular shims sized to be received in the annular spring receiving groove 102 of the end fitting 46.

The annular collar 70 is provided with a plurality of fluid flow openings 108 extending axially therethrough. The cross-sectional area of the openings 108 is such that the total thereof is at least as great as the cross-sectional area of the flow openings of the refrigerant lines in which the expansion device is to be installed. The location of the openings 108 within the collar 70 is such that they lie within a circular region less than the diameter of the flow metering port 60 of the flow metering partition 58.

An annular groove 110 is provided in the elongated member 66 immediately to the right of the collar 70. This groove 110 is adapted to receive and retain a washer shaped flexible seal 112. The seal 112 has a central opening therethrough which defines an inner-diameter which allows it to be received in and to be retained by the groove 110. The flexible nature of the seal 112 allows it to be installed, without permanent deformation, over the enlarged end 88 of the elongated member 66. The outer diameter of the seal 112 is slightly less than the outside diameter of the flow metering port 60. The seal 112 is configured to overlie each of the plurality of fluid flow openings 108 and to prevent refrigerant flow through these openings when refrigerant is flowing through the device 18 from right to left as viewed in the drawings and to readily allow refrigerant to pass therethrough when flow is from left to right. In the preferred embodiment, the seal 112, which is basically a check valve, is fabricated from a synthetic resin, such as teflon.

As previously discussed in connection with FIG. 1, a cooling expansion device 18 is installed in a refrigeration system to receive liquid refrigerant at a high pressure through a high side refrigerant line which communicates with the fitting 38, and, serves to regulate the flow of refrigerant therethrough to deliver refrigerant through the fitting 54 via a low side refrigerant line to the evaporator 12 at optimum conditions. Referring now to FIG. 2, the expansion device 18 is shown in a static no-flow condition. As shown, as described above, the refrigerant metering spring 98 is biasing the collar 70 into engagement with the o-ring 78, carried by the flow metering partition 58, to prevent the flow of refrigerant through the expansion device.

When the refrigeration system is started up, the pressure differential between the high and low sides begins to develop, when the pressure differential exceeds the threshold pressure differential for the system, the elongated member 66 begins to move to the left and the flow of refrigerant begins to pass through the flow metering passage 82 defined between the flow metering section 80 of the member 66 and the flow metering port 60 of the flow metering partition 58.

As a general rule, consistent with optimization of the operation of the refrigeration system in the cooling mode, it has been found that the cross-sectional area of the flow metering portion 80 of the elongated member 66 should progress from a smaller cross-sectional area adjacent the collar 70 to a larger cross-sectional area as the right hand end of the elongated member 66 is approached. The relationship thus established is that the flow metering passage 82 defined by the port 60 and the flow metering geometry 80 is larger at low pressure differentials and decreases as the pressure differential across the partition 58 increases.

Figure 3:
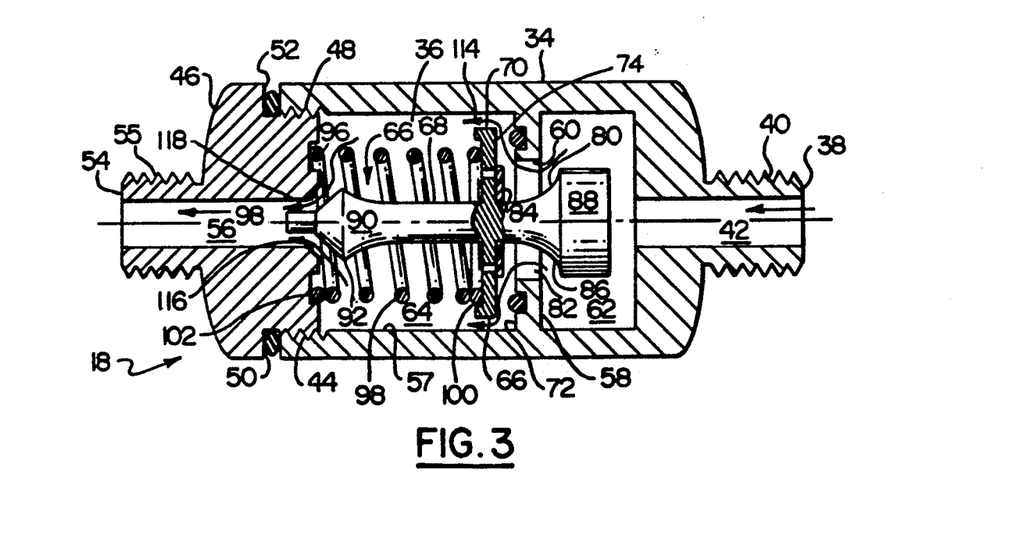
FIG. 3 is a longitudinal sectional view of the device of FIG. 2 in a metering flow mode of operation.

FIG. 3 illustrates the cooling expansion device 18 during a normal metering mode of operation wherein the elongated member 66 has been displaced to the left in response to a normal operating pressure differential within the system. In this mode of operation, the flow of refrigerant through the device is represented by the arrows 114. As shown in this figure, a second flow metering passageway begins to influence the flow of refrigerant being metered through the device. This second flow metering passageway 116 is defined between the frusto-conical surface 94, formed on the left hand end of the elongated member 66, and a mating, beveled annular surface 118 extending substantially parallel to the frusto-conical surface 94, which is formed on the inside end surface of the end fitting 46. In FIG. 3, the passageway 116 defined between these elements is substantially equal in cross-sectional area to the flow metering passageway 82.

Figure 4:
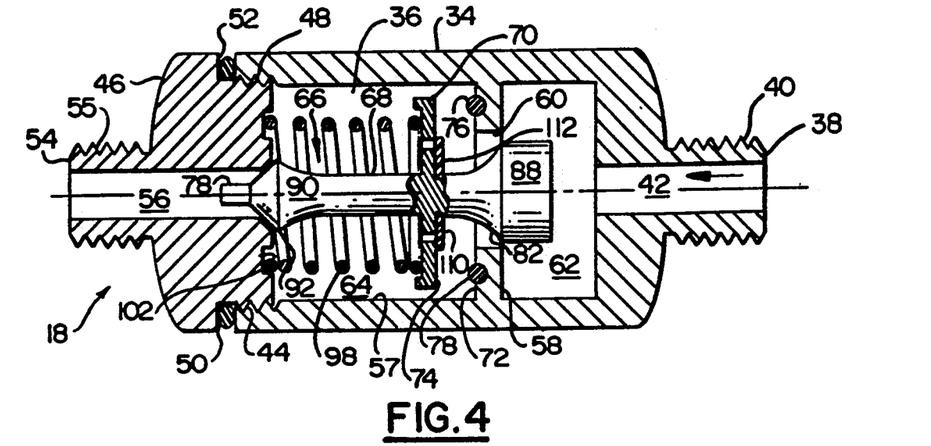
FIG. 4 is a longitudinal sectional view of the device of FIG. 2 operating in the high pressure shut off mode of operation.

As the pressure differential within the device builds up, the elongated member 66 moves further to the left, and, the second flow metering passageway 116 will take over from the flow metering passageway 82 to thereby further reduce the flow metering cross-sectional area. At a high pressure differential, as illustrated in FIG. 4, the elongated member 66 will move completely to the left and the frusto-conical portion 94 will sealingly engage the mating surface 118 formed on the end fitting 46. Such engagement will prevent further refrigerant flow through the expansion device to thereby prevent damage to the compressor, which could result if operation were allowed to continue at the extremely high pressure differentials required to cause the device to move to this position.

Figure 5:
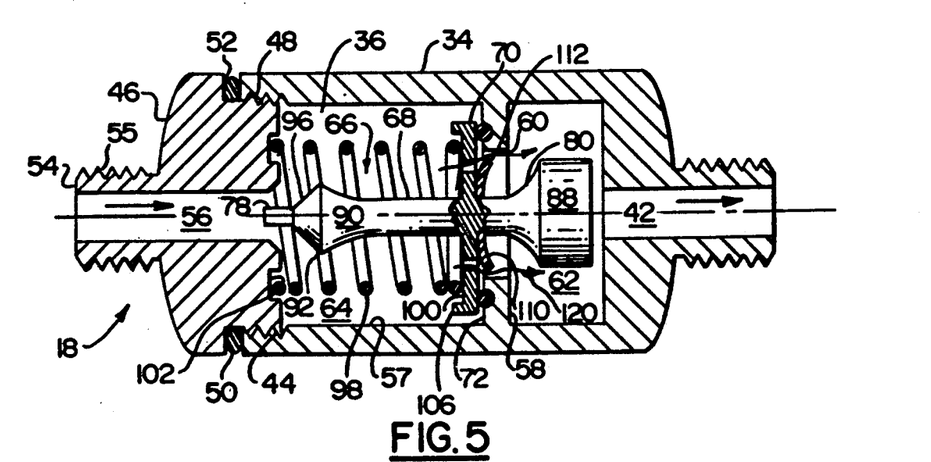
FIG. 5 is a longitudinal sectional view of the device of FIG. 2 in a bypass mode of operation.

FIG. 5 illustrates the cooling expansion device 18 in bypass operation wherein refrigerant is flowing from left to right as viewed in the drawing figure. Under these conditions, the flow of refrigerant through the bypass openings in the collar 70 (as represented by the reference numeral 120) causes the flexible seal element 112 to lift from the face of the collar to allow a substantially unrestricted flow through the bypass openings.

Referring now back to FIG. 1, when the heat pump system 10 is operated in the heating mode, the setting of the four-way valve 28 is reversed, thus changing the direction of refrigerant flow through the system. Accordingly, in the heating mode, the hot gas discharged from the compressor via discharge line 26 is directed via refrigerant line 30 to the first heat exchanger 12 where it is condensed to a hot liquid state. The hot, high pressure liquid refrigerant passes from the first heat exchanger 12 through the bypass openings of the cooling expansion device 18 and through interconnecting refrigerant line 16 to the heating expansion device 20 where it is metered in a controlled manner according to the present invention into the low pressure second heat exchanger 14 where it evaporates and absorbs heat from its external surroundings. The low pressure refrigerant vapor passing from the evaporator coil 14 then returns to the compressor 22 via refrigerant line 32, the four-way valve 28, and the compressor suction line 24 to complete the circuit.

It will be appreciated that in the heating mode of operation, the first heat exchanger 12, which functions as a condenser coil, is the indoor coil, and is transferring heat to the indoor air. Similarly, in the heating mode, the second heat exchanger 14 which functions as an evaporator coil, is the outdoor coil, and is extracting heat from the ambient air.

Referring now to FIGS. 6-9, the heating expansion device 20 includes a generally cylindrical housing 122. The housing 122 defines a cylindrical elongated chamber in the interior thereof which is divided into a low pressure portion 124 and a high pressure portion 126 by a flow metering partition 128. The ends of the housing 122 are closed by threaded end fittings 130 and 132, each, substantially similar to the end fitting 46 associated with the cooling expansion device 18.

The flow metering partition 128 forms an integral part of the interior wall of the housing 122 and has a flow metering port 131 extending axially therethrough communicating the high and low pressure portions 124, 126, of the housing. A plurality of bypass flow openings 134 are provided in the flow metering partition 128. A bypass opening seal 136 substantially identical to that described hereinabove with respect to the cooling expansion device is mounted on the wall of the flow metering partition 128 which lies within the low pressure portion 124 of the housing. The bypass seal is retained in overlying relationship with the bypass openings 134 by an annular groove 138 provided in an axial extension 140 of the flow metering partition 128.

Axially positioned within the housing 122 is an elongated member 142 having a radially extending solid collar 144, extending from the central portion thereof, which is configured substantially the same as the collar 70 of the cooling expansion device 18. As with the cooling device 18, the collar is sized to engage with an o-ring 146 carried in an annular groove 148 in the left hand facing wall of the flow metering partition 128. A plurality of bypass flow openings 152 are provided in the collar 142. In this embodiment, the openings 152 may be slotted to assure alignment thereof with the bypass openings 134, in the partition 128, during operation of the device, when the elongated member 142 is in motion.

A helical refrigerant metering spring 154 is disposed within the low pressure portion 124 of the housing 122 in a manner identical to the mounting of the spring 98 in the above described cooling expansion device 18. The operation of the spring 154 and the manner in which it is pre-loaded to allow a pressure differential between the high and low sides of the refrigeration system during system shutdown is identical to that described above with respect to the cooling expansion device 18.

Extending from the right of the collar 144, the elongated member 142 includes a flow metering section 155, which has flow metering geometry formed thereon. As with the above described cooling expansion device, the flow metering geometry is configured to cooperate with the flow metering port 131, formed in the partition 128, to define therebetween a flow metering passageway 156. The flow metering geometry of the flow metering section has a cross-sectional area which progresses from a maximum value at its origination 158 at the collar 144 to a minimum value 160 near its right hand end where it flaves outwardly to define an enlarged diameter planar end 161.

Figure 6:
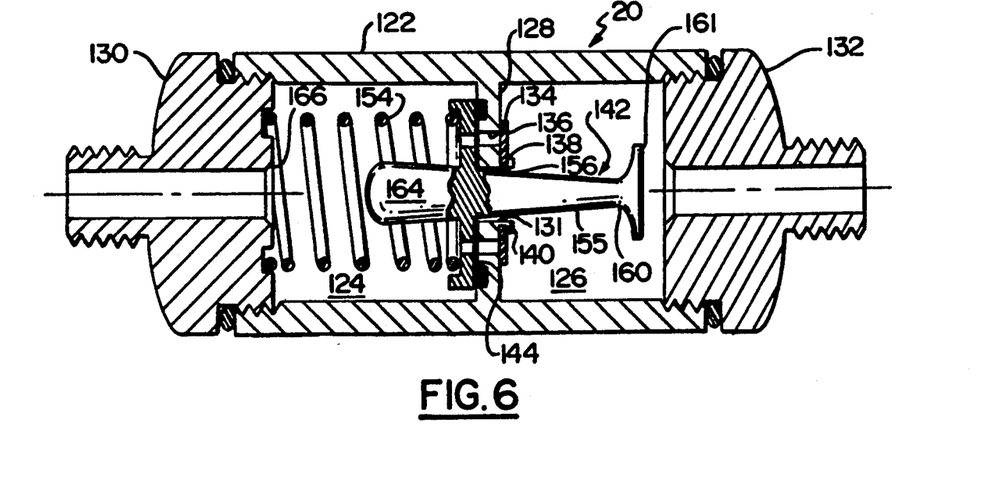
FIG. 6 is a longitudinal sectional view of a variable area heating expansion device that is made in accordance with the principals and teachings of the present invention.

As discussed above in connection with FIG. 1, the heating expansion device 20 is installed in a refrigeration system to receive liquid refrigerant at a high pressure through a high side refrigerant line which communicates with the end fitting 132, and serves to regulate the flow of refrigerant therethrough to deliver refrigerant through the other end fitting 130 via a low side refrigerant line to the evaporator 14 at optimum conditions. Referring now to FIG. 6, the heating expansion device 20 is shown in a static no-flow condition. In this condition, the refrigerant metering spring 154 is biasing the collar 144 into engagement with the o-ring 146, carried by the flow metering partition 128, to prevent the flow of refrigerant through the expansion device.

When the refrigeration system is started up, the pressure differential between the high and low sides begins to develop, when the pressure differential exceeds the threshold pressure differential for the system, the elongated member 142 begins to move to the left and the flow of refrigerant begins to pass through the flow metering passage 156 defined between the flow metering section 155 of the member 142 and the flow metering port 131 of the flow metering partition 128.

Figure 7:
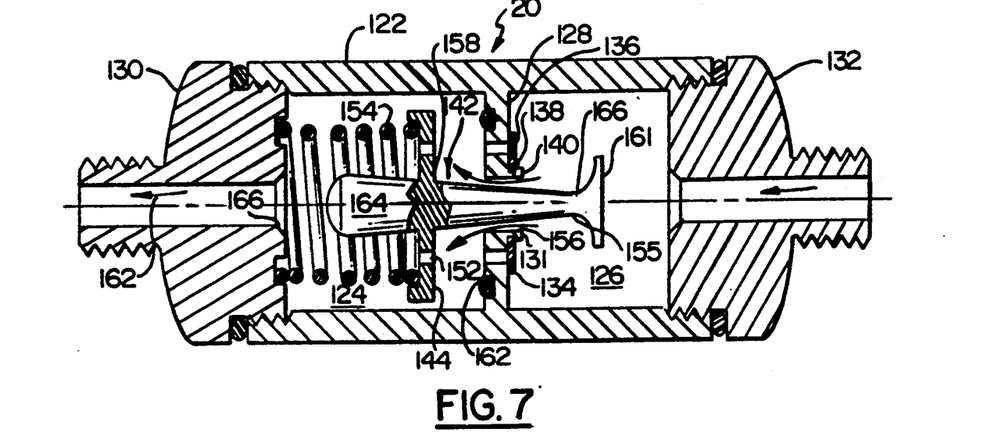
FIG. 7 is a longitudinal sectional view of the expansion device of FIG. 6 in the metering mode of operation.

As a general rule, consistent with optimization of the operation of a heat pump system in the heating mode, it has been found that the cross-sectional area of the flow metering portion 155 of the elongated member 142 should progress from a larger cross-sectional area adjacent the collar 144 to a smaller cross-sectional area as the right hand end of the elongated member 142 is approached. The relationship thus established is that the flow metering passage 156 defined by the port 131 and the flow metering geometry 155 is smaller at low pressure differentials and increases as the pressure differential across the partition 128 increases. FIG. 7 illustrates the heating expansion device 20 during a normal metering mode of operation wherein the elongated member 142 has been displaced to the left in response to a normal operating pressure differential within the system. In this mode of operation, the flow of refrigerant through the device is represented by the arrows 162.

Figure 8:
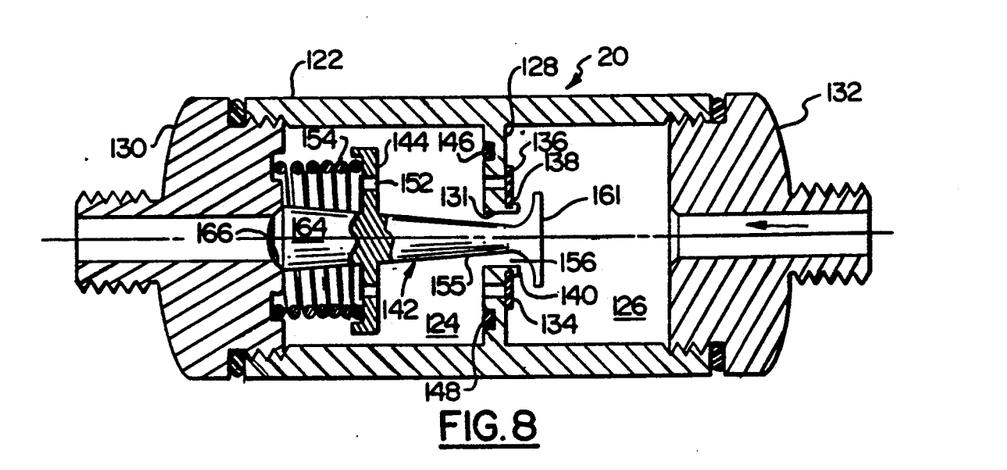
FIG. 8 is a longitudinal sectional view of the device of FIG. 6 in the high pressure shut off mode of operation.

As the pressure differential within the heating expansion device 20 builds up, the elongated member 142 moves further to the left to thereby further increase the flow metering cross-sectional area. At a high pressure differential, as illustrated in FIG. 8, the elongated member 142 will move to the left to the point where a bulbous section 164 carried at the left hand of the elongated member 142 will sealingly engage a mating surface 166 formed on the interior surface of the left hand end plug 130. Such engagement will prevent further refrigerant flow through the expansion device to thereby prevent damage to the compressor, which could result if operation were allowed to continue at the extremely high pressure differentials required to cause the device to move to this position.

Figure 9:
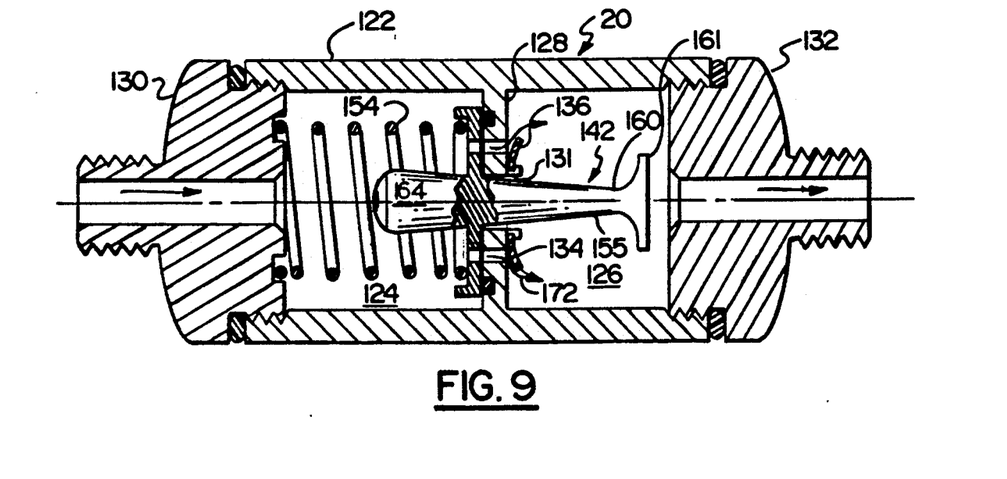
FIG. 9 is a longitudinal sectional view of the expansion device of FIG. 6 in the bypass mode of operation.

FIG. 9 illustrates the heating expansion device 20 in bypass operation wherein refrigerant is flowing from left to right as viewed in the drawing figure. Under these conditions, the flow of refrigerant through the bypass openings in the collar 144 and the flow metering partition 128 is represented by the arrows bearing the reference numeral 172. Under these conditions, the bypass flow causes the flexible seal element 136 to lift from the face of the collar to allow a substantially unrestricted flow through the bypass openings.

Each of the embodiments of the invention described above are designed to allow an expansion device to dynamically react to the changing conditions of a refrigeration system in which they are used. Specifically, each device varies the cross-sectional area of a flow metering passage as a function of the pressure differential between the high pressure side and the low pressure side of a refrigeration system by causing movement of a refrigerant metering rod, having a flow metering geometry formed thereon, with respect to a fixed flow metering orifice within the device.

Custom designing of an expansion device according to the present invention for a particular operating system is readily facilitated by analyzing the forces acting on the moveable elongated members 66, 142, respectively, for the cooling and heating expansion devices. The following equation sets forth these forces:

$$F = P_{high} \times A_{high} - P_{low} \times A_{low} = K x$$

In the foregoing equation, the variables and constants used are defined as follows:

$P_{high}$ = pressure on the high pressure side of the system in which the device is used.

$A_{high}$ = effective area of the movable member upon which the high pressure is acting.

$P_{low}$ = pressure on the low pressure side of the device.

$A_{low}$ = effective area of the movable member upon which the low pressure is acting.

$K$ = spring rate.

$x$ = movement of elongated member.

Use of the above equation, along with well know refrigeration design techniques, will enable an engineer to customize an expansion device to control the flow of refrigerant in a heating or cooling system at optimum conditions over a wide range of operating conditions. The design will provide an optimum expansion area for a variety of different operating conditions. This is achieved by varying the cross-sectional area of the flow metering geometry bearing portion of the moveable elongated members 66, 142.

Given a number of different operating conditions, a corresponding optimum expansion orifice cross-sectional area, and the corresponding pressure differentials between the high and low sides of a given system, may be readily determined using well know refrigeration design techniques. With this information available, the only unknown in the above equation is x, i.e., the movement of the elongated members. Solving the equation for x tells the designer what the expansion area should be at a certain point along the rod.

Following these steps for a number of other operating conditions will provide a designer with a number of optimum expansion areas at different locations along the flow metering portion of the elongated members. With this information, the size of the flow metering ports and the configuration of the flow metering geometry of the elongated members may be selected such that the flow metering passageway defined in the space between these two elements provides the desired optimum expansion area, for given conditions, at corresponding positions along the flow metering geometry bearing portion of the elongated members.

Accordingly, it should be appreciated that a refrigerant expansion device has been provided wherein the cross-sectional area of the flow metering passage is controlled to an optimum size for a broad range of operating conditions of a refrigeration system. Such flow metering is achieved by controlling the cross-sectional area of the flow metering passage of an expansion device as a function of the pressure differential between the high pressure side and the low pressure side of a refrigeration system.

This invention may be practiced or embodied in still other ways without departing from the spirit or essential character thereof. The preferred embodiment described herein is therefor illustrative and not restrictive, the scope of the invention being indicated by the appended claims and all variations which come within the meaning of the claims are intended to be embraced therein.

I claim:

1. An expansion device for metering the flow of refrigerant therethrough comprising:

a housing having a flow passage therethrough;

a partition disposed within said flow passage, said partition having a flow metering port extending therethrough, said partition dividing said flow passage into a high pressure portion and a low pressure portion;

an elongated member extending through said metering port, said elongated member and said metering port cooperating to define a flow metering passageway therebetween, said member being configured to vary the cross sectional area of said flow metering passageway in relation to the position of said member to said port;

means for supporting said elongated member within said flow passage and for controlling the axial position of said elongated member within said passage in response to the differential pressure between the refrigerant in said high pressure portion and said low pressure portion, said means for supporting and controlling including stop means forming a part of said elongated member, said stop means being located within said low pressure portion of said flow passage and being adapted to engage said partition to limit the axial movement of said elongated member in a direction going from said low pressure portion to said high pressure portion, and, means for biasing said stop means into engagement with said partition; and means located within said low pressure portion of said flow passage for shutting off the flow of refrigerant through said expansion device when the pressure of refrigerant in said high pressure portion exceeds a predetermined value.

2. The apparatus of claim 1, wherein the portion of said elongated member extending from said stop means, through said flow metering port and into said high pressure portion of said flow passage, has a flow metering geometry formed thereon.

3. The apparatus of claim 2, wherein said flow metering geometry comprises an increase in cross-sectional area of said portion of said elongated member in the direction extending from said stop means into said high pressure portion of said flow passage, whereby said flow metering passageway decreases in cross-sectional area as said elongated member moves in the direction going from said high pressure portion to said low pressure portion.

4. The apparatus of claim 3, including means, located within said low pressure portion of said flow passageway, for defining a second flow metering passageway, said second flow metering passageway also decreasing in cross-sectional area as said elongated member moves in the direction going from said high pressure portion to said low pressure portion, said second flow metering passageway becoming smaller in cross-sectional area than said flow metering passageway at a predetermined pressure within said high pressure portion.

5. The apparatus of claim 4, wherein said second flow metering passageway operate to shut off refrigerant flow through said expansion device when a second predetermined pressure within said high pressure portion of said flow passage is reached.

6. The apparatus of claim 2, wherein said flow metering geometry comprises a decrease in the cross-sectional area of said portion of said elongated member in the direction extending from said stop means into said high pressure portion of said flow passage, whereby said flow metering passageway increases in cross-sectional area as said elongated member moves in the direction going from said high pressure portion to said low pressure portion.

* * * * *